United States Patent [19]

Holman et al.

[11] 4,320,252

[45] Mar. 16, 1982

[54] TELECOMMUNICATION CABLE CLOSURE

[75] Inventors: James R. Holman, Gwinnett County; Robert N. McIntyre, DeKalb County, both of Ga.

[73] Assignee: Western Electric Company, Inc., New York, N.Y.

[21] Appl. No.: 184,564

[22] Filed: Sep. 5, 1980

[51] Int. Cl.³ .......................................... H02G 15/24
[52] U.S. Cl. ..................................... 174/21 R; 174/78
[58] Field of Search .................. 174/21 R, 78, 91, 92, 174/93, 19

[56] References Cited

U.S. PATENT DOCUMENTS

| | | | |
|---|---|---|---|
| 2,972,004 | 2/1961 | Merrell et al. | 174/91 |
| 3,240,868 | 3/1966 | Ets-Hokin et al. | 174/21 R X |
| 3,769,443 | 10/1973 | Pierzchala et al. | 174/78 X |
| 3,915,540 | 10/1975 | Thompson et al. | 174/78 X |
| 4,090,029 | 5/1978 | Lundeberg . | |
| 4,140,870 | 2/1979 | Volkers | 174/78 |

*Primary Examiner*—Roy N. Envall, Jr.
*Attorney, Agent, or Firm*—Robert B. Kennedy

[57] ABSTRACT

A pressurizable closure is disclosed for a telecommunication cable. The closure has a metallic air valve extending through a closure to each end of which electrical couplers are secured for use in grounding the cable sheath.

5 Claims, 3 Drawing Figures

TELECOMMUNICATION CABLE CLOSURE

TECHNICAL FIELD

This invention relates to pressurizable closures such as cable end seals and splice cases for telecommunication cables.

BACKGROUND OF THE INVENTION

Telecommunication cables today are often pressurized to prevent entry of moisture. Pressurization is typically accomplished by forcing compressed dry air into the cable through a valve mounted on a splice case or end seal cap. End seals themselves are used to seal ends of cables temporarily prior to their being spliced together in the field while splice cases enclose and protect the splices once they have been made.

Pressurized telecommunication cables are comprised of a core formed of a number of insulated twisted wire pairs or quads. The core is surrounded by a metallic sheath or shield that provides electromagnetic, mechanical and lightening arrest protection for the core. An outer plastic jacket overlays the sheath. It is usually necessary to couple the metallic sheath with an electrical ground located exteriorly of the cable itself. Since it is not readily feasible to extend a conductive wire from the sheath through the cable jacket itself, while maintaining integrity of cable pressurization, such couplings of the jacket encapsulated cable sheaths with extrinsic grounding elements have typically been done through the closures themselves. In the case of splice case type closures such couplings of the sheaths with extrinsic grounding elements has been accomplished with the use of a stud that extends through the case wall. Electrical couplers are secured to each end of the stud to establish contact between the sheath and stud within the closure and between the stud and extrinsic grounding element exteriorly of the case. With end seals coupling has been effected by the use of a conductive wire that extends from the sheath through a tubular neck portion of the end seal cap which is sealed about the cable jacket.

Pressurized end seals equipped with grounding means of the type just described have proven to be leaky with leaks tending to occur where the conductive wires pass through the neck portion of the end caps over the cable jackets. That the wires have had to be of small gauge to minimize leak potential has also limited their current carrying capacity. With splice cases pressurization has not typically been a problem but rather the economics having to mold a stud into the body of the case.

Accordingly, there continues to exist a need to provide a pressurizable closure for a communication cable that includes means for effectively coupling a conductive element of the cable itself with extrinsic grounding means in an effective and efficient manner and without creating a potential for loss of pressurization. It is to this task to which the present invention is primarily directed.

SUMMARY OF THE INVENTION

In a preferred form of the invention a pressurizable closure is provided for a telecommunication cable which closure comprises a hollow body adapted to be placed about and sealed to an end of a cable. A metallic valve extends through a wall of the hollow body through which a pressurizing fluid may be introduced into the hollow body. Means are provided for electrically coupling a portion of the metallic valve located inside the hollow body with an electrically conductive component of the cable end housed within the body. Means are also provided for electrically coupling a portion of the metallic valve located outside the hollow body with an extrinsic electrical grounding element.

DETAILED DESCRIPTION

Figure 1:
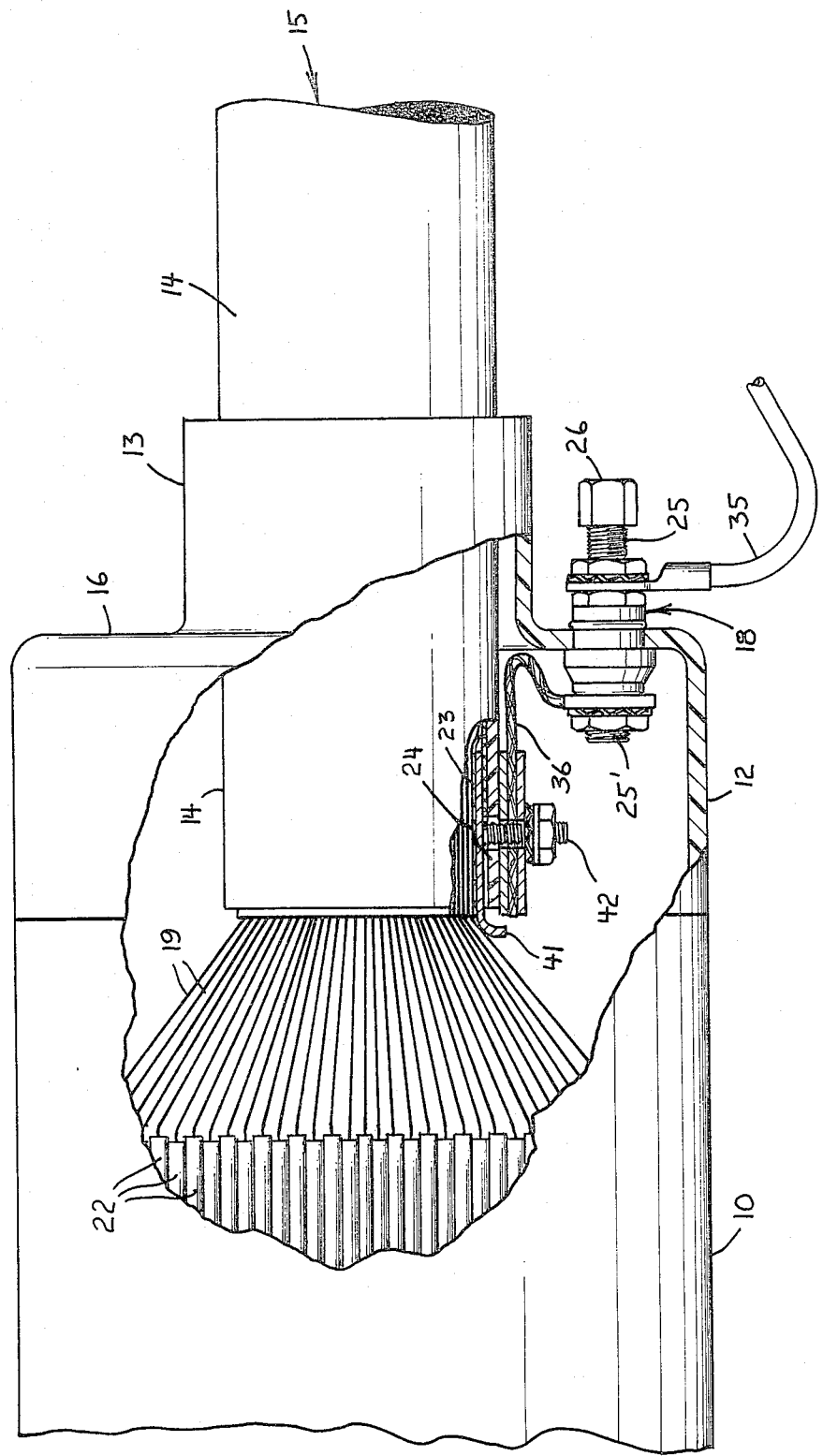
FIG. 1 is a side elevational view, partly in cross-section, of a pressurizable closure for a telecommunication cable which embodies principles of the invention in one preferred form and which is shown mounted to an end of a telecommunication cable.
Figure 2:
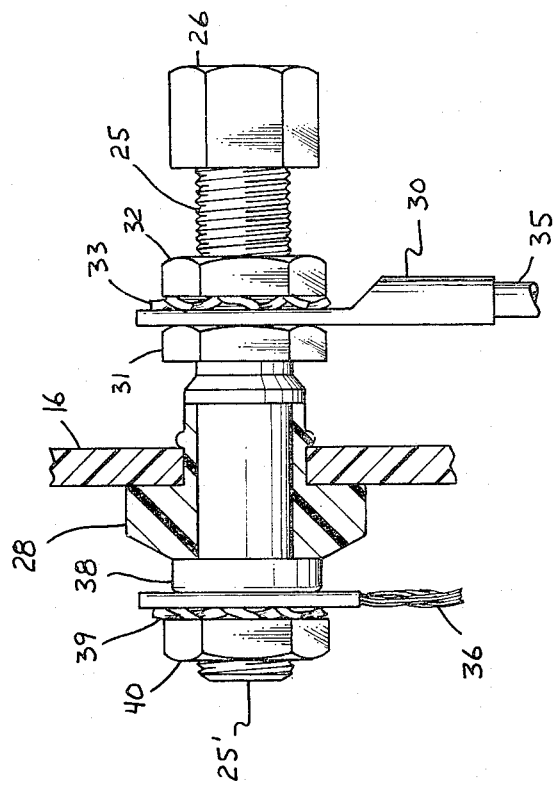
FIG. 2 is an exploded view, in perspective, of the means for coupling an end portion of a braided conductor with the cable sheath shown in FIG. 1.
Figure 3:
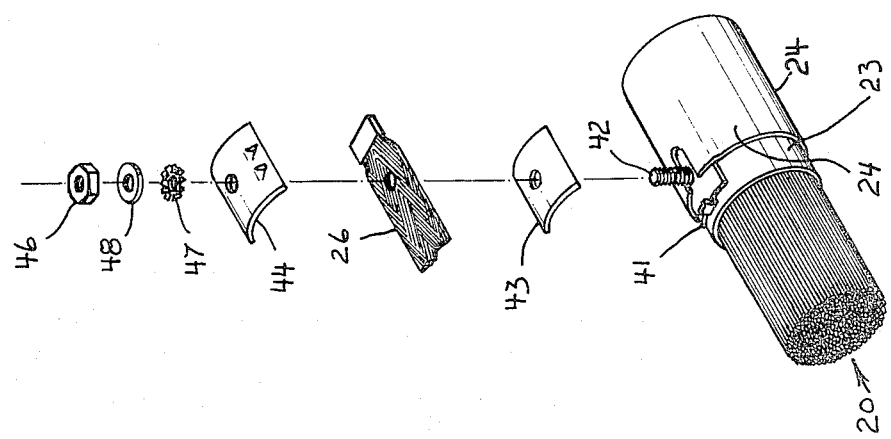
FIG. 3 is an exploded view, in perspective, of the the valve portion of the pressurizable closure illustrated in FIG. 1.

Referring now in more detail to the drawing, there is shown a pressurizable closure for a telecommunication cable that embodies principles of the invention. Here the closure is in the form of an end seal having an end cap segmented into two body sections. A first body section 10 is closed at an unshown end thereof while a second end cap body section 12 is threadedly mounted to the first body section and sealed to the cable jacket. Each of the body sections is composed of a electrically insulative material such as high density polyethylene. The body section 12 has a neck portion 13 of reduced inside and outside diameters which is fitted tightly about and hermetically sealed as by the use of heat shrinkable tape to the outer plastic jacket 14 of a cable 15. An annular wall portion 16 of the cap body section 12 located to one end of the neck portion 13 is provided with an aperture through which a metallic air valve 18 extends. The plastic cable jacket 14 is terminated within the end cap from which termination individual wires 19 of the cable core 20 fan out to be joined to one or more banks of connectors 22. The tubular, metallic sheath 24 of the cable is similarly terminated adjacent the termination of the jacket 14.

Valve 18 is seen to include a threaded valve stem 25 closed at one end exteriorly of the end cap body section by a valve cap 26. The other end 25' of the threaded valve stem 25 is located inside the end cap. A rubber grommet 28 extends through the aperture formed in the cap wall 16 fitted snugly about the valve body thereby sealing the aperture. A terminal lug 30 is secured about the valve stem by means of nuts 31 and 32. A lockwasher 33 is sandwiched between the nut 32 and lug 30. A grounding wire 35 extends from the lug outside the end cap. A wire mesh or braided conductor 36 is mounted about the valve stem 25 inside the end cap between a spacer 38 that abuts grommet 28 and a lockwasher 39 and nut 40 threaded on the valve stem end 25'.

With continued reference to the drawing the braided conductor 36 is seen to be electrically coupled with the metallic cable sheath 24 by means of a bonding clamp that includes an arcuate clamp section 41 positioned over the core wrap 23 in flush contact with the metallic sheath 24 with a portion of the clamp section underlaying the cable plastic jacket 14. A threaded stud 42 projects upwardly from clamp section 41 through a second bonding clamp section 43 and a third bonding clamp section 44. An end of the braided conductor 26 is sandwiched between these second and third bonding clamp elements. The assembly is held tightly together by means of a nut 46 threaded upon the stud 42 and washers 47 and 48.

In assembling the just described apparatus the valve 18 are firstly mounted to the end cap body section 12 and the grounding wire 35 and braided conductor 36 attached to it. The body section 12 is then slid onto the cable 15. End portions of the plastic cable jacket 14 and cable shield 24 are then stripped away to expose the cable core 20. Connectors 22 are now attached to the core wires 19. The bonding clamp assembly and braided conductor are next attached to the cable end as previously described. The end cap body section 10 is then threaded onto body section 12 over the bank or banks of connectors 22. The tubular neck portion 13 of the end cap body section 12 is then hermetically sealed to the cable jacket as by the use of a heat shrinkable band heat shrunk down upon the end of the neck portion 13 and that portion of the jacket emerging from the neck portion. Another hermetic seal is similarly formed at the juncture of the two end cap body sections as with a plastic, fusable band. The cable is then pressurized with dry air forced into the end seal through the valve 18. The grounding wire 35 may be attached to appropriate grounding means such as to a cable reel during cable transport or to a grounding stake implanted in ground terrain. When the cable is later connected to another cable the end cap or a portion thereof is removed and the connectors 22 joined to connectors of an adjoining cable. A splice case having the same valve 18 and electrical couplers may then be mounted to the cable about the splice.

It thus is now seen that a closure is provided for a telecommunication cable which closure has means for effecting pressurization and for readily coupling the cable shield with ground with means that can conduct high currents. The closure has proven hermetically sound in that loss of pressurization rarely occurs. In addition, the closures have proven to be quite economical in that the very valve means used in pressurizing the cable does itself provide an electrical path between the inside and outside of the cable closure in grounding the cable sheath.

It should be understood that the just described embodiment merely illustrates principles of the invention in one preferred form. Many modifications, additions and deletions may, of course, be made thereto without departure from the spirit and scope of the invention as set forth in the following claims.

What is claimed is:

1. A pressurizable closure for a telecommunication cable comprising, in combination, a hollow body adapted to be placed about and sealed to an end of at least one cable; a metallic valve extending through a wall of said hollow body through which valve a pressurizing fluid may be introduced into said body; first means for electrically coupling a portion of said metallic valve located inside said hollow body with an electrically conductive component of the cable housed within said hollow body; and second means for electrically coupling a portion of said metallic valve located outside said hollow body with an extrinsic electrical grounding element.

2. A pressurizable closure in accordance with claim 1 wherein said valve has a threaded valve stem located inside said hollow body; and wherein said first coupling means comprises a bonding clamp adapted to be clamped to a cable jacket flush against a metallic cable sheath underlaying said jacket from which bonding clamp a threaded stud projects, a braided conductor extending between said threaded valve stem and said bonding clamp stud, and nut means for tightly holding said braided conductor to said valve stem and bonding clamp stud.

3. A pressurizable closure in accordance with claim 1 or 2 wherein said valve has a threaded valve stem located outside said hollow body, and wherein said second coupling means comprises a terminal lug mounted to said threaded valve stem outside said hollow body from which lug a grounding wire extends.

4. A pressurizable closure in accordance with claim 1 wherein said hollow body is formed of a electrically insulative plastic material.

5. A pressurizable cover in accordance with claim 1 wherein said hollow body is adapted to be placed about and hermetically sealed to an end of a cable and thereby provided an end seal.

* * * * *